US 12,445,765 B1

(12) United States Patent
Thorsell

(10) Patent No.: US 12,445,765 B1
(45) Date of Patent: Oct. 14, 2025

(54) LOUDSPEAKER SYSTEM COMPRISING A HEADREST

(71) Applicant: Blueprint Acoustics Pty Ltd, Endeavour Hills (AU)

(72) Inventor: Erik Thorsell, Billdal (SE)

(73) Assignee: Blueprint Acoustics Pty Ltd, Endeavour Hills (AU)

( * ) Notice: Subject to any disclaimer, the term of this patent is extended or adjusted under 35 U.S.C. 154(b) by 0 days.

(21) Appl. No.: 19/246,891

(22) Filed: Jun. 24, 2025

(51) Int. Cl.
 *H04R 1/28* (2006.01)
 *G10K 11/178* (2006.01)
 *H04R 1/02* (2006.01)

(52) U.S. Cl.
 CPC ......... *H04R 1/2873* (2013.01); *G10K 11/178* (2013.01); *H04R 1/025* (2013.01); *G10K 2210/32272* (2013.01)

(58) Field of Classification Search
 CPC .... H04R 1/2873; H04R 1/025; G10K 11/178; G10K 2210/32272
 USPC .......................................................... 381/337
 See application file for complete search history.

(56) References Cited

U.S. PATENT DOCUMENTS

| | | | | |
|---|---|---|---|---|
| 4,490,842 | A * | 12/1984 | Watanabe | B60N 2/803 381/86 |
| 11,981,239 | B2 | 5/2024 | Guadagnin | |
| 2023/0191970 | A1* | 6/2023 | Lade | H04R 1/323 381/86 |
| 2023/0199377 | A1* | 6/2023 | Corynen | H04R 1/025 381/86 |

(Continued)

FOREIGN PATENT DOCUMENTS

| | | |
|---|---|---|
| CN | 117944546 A | 4/2024 |
| WO | 2024/153659 A1 | 7/2024 |

*Primary Examiner* — Sean H Nguyen
(74) *Attorney, Agent, or Firm* — RENNER, OTTO, BOISSELLE & SKLAR, LLP

(57) ABSTRACT

A loudspeaker system includes a loudspeaker assembly and a headrest having a front side and a rear side, the front side being constituted for resting a back side of a head of a person. The loudspeaker assembly is accommodated in the headrest with its front side oriented towards the front side of the headrest, the loudspeaker assembly including a first and a second driver each having a primary side and a secondary side for emitting sound, and first and second chambers, a part of the first chamber being limited by the primary side of the first driver and a part of the second chamber being limited by the primary side of the second driver. The assembly further includes a first front set of vent ducts venting the first chamber and terminating at the front side of the headrest, a second front set of vent ducts venting the second chamber and terminating at the front side of the headrest, at least one further chamber and at least one rear set of vent ducts. The secondary sides of the first and second drivers limit a part of one of the at least one further chamber or limit a part of different ones of the at least one further chamber, the at least one further chambers being respectively vented by a respective one of the at least one rear set of vent ducts terminating at the rear side of the headrest. The first and second chambers together with the front ducts form front Helmholtz resonators, the at least one further chamber together with the at least one rear set of vent ducts form at least one rear Helmholtz resonator.

14 Claims, 7 Drawing Sheets

(56) References Cited

U.S. PATENT DOCUMENTS

| | | | |
|---|---|---|---|
| 2023/0209261 A1* | 6/2023 | Homma | B60N 2/879 381/301 |
| 2024/0284095 A1 | 8/2024 | Ito | |
| 2024/0414474 A1 | 12/2024 | Corynen | |

* cited by examiner

LOUDSPEAKER SYSTEM COMPRISING A HEADREST

FIELD OF THE INVENTION

The present invention has the object of providing a loudspeaker system comprising a headrest and a loudspeaker assembly which allows for establishing a good sound quality at woofer frequencies near the headrest.

Aspects of the present invention, examples and exemplary steps and their embodiments are disclosed in the following. Different exemplary features of the invention can be combined in accordance with the invention wherever technically expedient and feasible.

BACKGROUND

A loudspeaker in a headrest is described in WO 2024/153659. Further prior art includes US2024/0284095, U.S. Ser. No. 11/981,239, CN117944546, US2024414474, and US2023199377.

SUMMARY OF THE INVENTION

The present invention is described by the subject-matter of the independent claims. Dependent claims are directed to embodiments of advantage. In this section "general description of the invention", besides the features mentioned in the claims, a description of further general features of the present invention is given, for example, by referring to possible embodiments of the invention.

Features of the present invention, examples and exemplary steps and their embodiments are disclosed in the following. Different exemplary features of the invention can be combined in accordance with the invention wherever technically expedient and feasible.

The invention relates to a loudspeaker system comprising a loudspeaker assembly and a headrest.

For example, the loudspeaker system is constituted to issue sound within a frequency range, for example in an audible frequency range. For example, the frequency range of the loudspeaker assembly is a frequency range of at least one of a woofer or subwoofer. For example, the lower end of the frequency range of the loudspeaker assembly is 15 Hz, for example, 20 Hz, for example 30 Hz, for example, 50 Hz. For example, the upper end of the frequency range of the loudspeaker assembly is 300 Hz, for example 200 Hz, for example 150 Hz, for example 100 Hz. For example, the lower and upper limit define the operating band of the loudspeaker assembly of the loudspeaker system. For example, the drivers of the loudspeaker assembly are constituted to allow for such a frequency range. For example, electronic means, for example an electronic circuit for changing the SPL over frequency of the loudspeaker assembly, for example an equalizer or an electronic filter (for example low pass filter or high pass filter) can be used to limit the operating band of the loudspeaker assembly at least one of the high frequency end or the low frequency end of the operating band of the loudspeaker assembly by respectively setting a cutoff frequency. The cutoff frequency is the frequency where the filter decreases the input signal at a declining rate of 6 dB per octave or greater.

For example, the loudspeaker system, can comprise at least one of mid or high frequency loudspeakers for extending the frequency range of the loudspeaker system towards higher frequencies, for example beyond the afore-mentioned upper ends of the frequency range of the loudspeaker assembly. For example, at least one of mid or high frequency loudspeakers are housed in the headrest. References to drivers in this specification do not include drivers in mid and high frequency loudspeakers.

The headrest is for example a headrest of a vehicle or a headrest of a game chair or an armchair. The headrest has a front side constituted to rest the back side of a person's head thereon. The remaining outer surface of the headrest, i.e. that part of the outer surface not including the front side, is referred to as "rear side". The rear side includes for example an upper side, a bottom side, two lateral sides (left and right), and a back side (which is (directly) opposite the front side) of the headrest. For example, the transition between the aforementioned sides of the outer surface of the headrest is continuously.

For example, the loudspeaker assembly is accommodated in the headrest. The expression "accommodated in the headrest" means that at least a major part of the loudspeaker assembly is included in the headrest. For example, the headrest is constituted so that space is provided for the at least major part of the loudspeaker assembly to be located therein. For example, the loudspeaker assembly is accommodated so that at least the chambers and the drivers are (completely) inside the headrest. For example, the loudspeaker assembly is accommodated that it is completely inside the headrest and no part thereof projects beyond the outer surface of the headrest. Alternatively, for example, one or more parts of the loudspeaker assembly can project beyond the outer surface, for example, at least one or more of the vent ducts of the set of vent ducts mentioned below project beyond the outer surface while a major part of the loudspeaker assembly is included in the headrest (like at least one of the chambers, drivers or non-outside projecting sections of the projecting vent ducts). In the latter case, the projecting sections of the vent ducts are preferably deformable.

That part of the loudspeaker assembly which points towards the front side of the headrest is referred to as front side of the loudspeaker assembly.

For example, the loudspeaker assembly comprises a first driver and a second driver. That is, the loudspeaker assembly can comprise further drivers. For example, the drivers can be driven by a single channel signal applied to all drivers or by a multi-channel (e.g. stereo) signal where, for example, the first and second driver are driven via different channels.

Each driver has two sides from which sound is emitted. One side of the two sides is referred to as primary side and the other side as secondary side. For example, the primary side can be the side at which a magnet of the driver is located, and the secondary side can be the opposite side or vice versa. For example, the primary side of a driver comprises one side of a diaphragm (e.g. a convex side) and the secondary side comprises the other side of the same diaphragm (e.g. a concave side).

For example, the loudspeaker assembly comprises a first chamber and a second chamber. The first and second chambers represent spaces which are enclosed. For example, the first chamber is limited in part by the primary side of the first driver. That is, the primary side of the first driver represents a part of the enclosure which encloses the first chamber. For example, the second chamber is limited in part by the primary side of the second driver. That is, the primary side of the second driver represents a part of the enclosure which encloses the second chamber.

Generally, herein, the expression "set of something" covers one or more of something, for example "set of vent ducts" covers one or more vent ducts.

For example, the first chamber is enclosed with the exception of interfaces with a first set of vent ducts, referred to as first front set of vent ducts. For example, the second chamber is enclosed with the exception of interfaces with a second set of vent ducts, referred to as second front set of vent ducts. The ducts of the first front set vent the first chamber and the ducts of the second front set vent the second chamber. For example, the interfaces are openings within the enclosures of the chambers and the ducts are fitted into the openings.

For example, the one or more vent ducts of the front sets terminate at the front side of the headrest. "Terminate at the front side of the headrest" covers for example that one or more vent ducts of the front sets terminate at the front side of the outer surface of the headrest, and covers, for example, that one or more vent ducts of the front sets terminate at the front side of the headrest while a section of the vent ducts project outwards from the outer surface of the headrest. For example, in the latter projecting case, the loudspeaker assembly is accommodated in the headrest so that the drivers and the chambers of the loudspeaker assembly are completely in the headrest. For example, the non-outward projecting sections of vent ducts of the front sets are inside the headrest.

For example, the loudspeaker assembly comprises at least one further chamber, for example, one further chamber, for example, at least two further chambers (for example two, three or four further chambers).

In case of one further chamber, for example, the one further chamber is partly limited by the secondary side of the first driver and partly limited by the secondary side of the second driver. That is, the secondary sides of the first and second driver form a part of an enclosure which encloses the one further chamber.

For example, the one further chamber is vented by a rear set of vent ducts terminating at the rear side of the headrest.

In case of at least two further chambers, for example, one of the at least two further chambers is partly limited by the secondary side of the first driver and another one of the at least two further chambers is limited by the secondary side of the second driver.

For example, the at least two further chambers are each vented by rear set of vent ducts terminating at the rear side of the headrest. That is, there is respectively one rear set of vent ducts for each of the at least two further chambers.

For example, the one or more vent ducts of the at least one rear set of vent ducts venting the at least one further chamber terminate at the rear side of the headrest. "Terminate at the rear side of the headrest" covers for example that one or more vent ducts of the rear sets terminate at the rear side of the outer surface of the headrest, and covers, for example, that one or more vent ducts of the rear sets terminate at the rear side of the headrest while a section of the vent ducts projects outwards from the outer surface of the headrest. For example, in the latter projecting case, the loudspeaker assembly is accommodated in the headrest so that the drivers and the chambers of the loudspeaker assembly are completely in the headrest. For example, the non-outward projecting sections of vent ducts of the rear sets are inside the headrest.

For example, the chambers together with the set of vent ducts form Helmholtz resonators. For example, the first chamber together with the first front set forms a first front Helmholtz resonator. For example, the second chamber together with the second front set forms a second front Helmholtz resonator. For example, a respective one of the at least one further chamber together with a respective one of the at least one rear set of vent ducts respectively form at least one rear Helmholtz resonator.

For example, the Helmholtz resonators are constituted to be passive or active Helmholtz resonators. For example, the active Helmholtz resonators comprise at least one of sensors, actuators, and a (real-time) feedback control to modify the resonators impedance or resonance frequency dynamically. For example, the feedback control can use a sound signal detected, for example, by the sensors which, for example, are located to detect sound issued by one or more of the vent ducts or located in the chambers. For example, the feedback control controls the actuators. For example, the feedback control modifies the sound signal for driving the first and second driver.

An advantage of a combination of the above described exemplary features is to achieve a loudspeaker assembly which emits sound of high directivity in the near field from the openings (referred to as "duct openings") of the front sets due to the use of Helmholtz resonators. This allows to achieve good sound quality in the near field for listeners resting their heads on the headrest or positioning their heads within for example 5 cm, for example 10 cm of the headrests. The duct openings of the front sets and rears sets are located where the vent ducts of the front and rear sets respectively terminate their extension towards the outside of the loudspeaker assembly.

For example, the first and second front sets comprise (for example, consist of) vent ducts which are deformable at least at the front side of the headrest where the vent ducts terminate. For example, the vent ducts of the first and second front set can comprise deformable end sections which terminate at the front side of the headrest. Alternatively, the vent ducts can be made completely of deformable material. For example, the length of the deformable end sections is longer than 1 cm, for example longer than 3 cm. This advantageously may prevent painful contact between the head of a person resting his or her head on the headrest and the vent ducts. For example, the material of the end sections is elastic. For example, the material is a padding, for example a foam or for example, the material is an extension of the external skin of the headrest.

For example, deformable filling material is included in the headrest which is located between acoustic components of the loudspeaker assembly and the outer surface of the headrest. Acoustic components other than ducts are for example at least one of the chambers or drivers or baffles (see below for the latter). For example, the thickness of deformable filling material is more than 1 cm, for example more than 3 cm. The extension of the thickness is from a respective one of the afore-mentioned acoustic components of the loudspeaker assembly to the respectively nearest part of the outer surface of the headrest.

For example, the loudspeaker system comprises a baffle body. For example, the baffle body comprises a front baffle section. For example, the front baffle section is located at the front side of the headrest. For example, the front baffle section is located between, on the one hand, an area span by the first and second front set and, on the other hand, an area including the rear set at the rear side of the headrest. For example, the front baffle section is constituted to block that sound travels from the at least one rear set (directly) through the headrest and then out of the front side of the headrest. For example, the baffle body, for example the front baffle section is constituted to force sound waves issued from primary and secondary sides of the drivers to travel (via the sets) around the headrest instead of through it. In this way, there is no sound travelling (directly) through the headrest which can cancel sound issued from the front sets.

For example, the headrest comprises at least a part of the baffle body. For example, the outer surface of the headrest together with filling of the headrest can have the effect of a baffle and block sound transmission therethrough. For example, the filling is a soft padding material to provide comfort, and safety if in vehicles.

For example, the headrest can comprise at least a part of the baffle body.

For example, the loudspeaker assembly can comprise at least a part of the baffle body. For example, this part is rigid such that it prevents woofer frequency sound transmission. For example, this (rigid) part can be located at least 1 cm, for example at least 3 cm within at least one of left, right, top or bottom sides of the headrest. For example, at least a part of walls enclosing the chambers of the loudspeaker assembly can work as baffle and therefore comprise at least a part of the baffle body.

For example, the baffle body comprises at least a section at the front side of the loudspeaker assembly, the section being referred to as front baffle section. The front baffle section can be formed by a front side part of the headrest (for example including outer surface (e.g. skin of headrest) and filling of headrest at the front side of the headrest) and, alternatively or additionally by a front side section of the loudspeaker assembly. The front side section can include at least one of wall sections of walls enclosing the chambers located at the front side of the loudspeaker assembly or walls provided in addition to the walls enclosing the chambers, for example for securing chambers in position.

Advantageously, the front baffle section is constituted to prevent acoustic short circuit through-the headrest. The acoustic short circuit is between sound emitted from the secondary and primary sides of the drivers.

For example, the baffle can comprise at least one further baffle section which can be integral with the front baffle section. The at least one further baffle section can extend, for example to at least one of the lateral sides (left or right) or top side or bottom side of the loudspeaker assembly. If the further baffle section comprises a rigid part, for example, the rigid part keeps the afore-mentioned distance of at least 1 cm, for example at least 3 cm from the nearest section of the outer surface of the headrest. Additionally or alternatively, the filling material can be sufficiently dense to provide the baffle body, i.e. sufficiently dense to prevent woofer frequency transmission.

Alternatively or additionally, the skin of the headrest or part thereof can, for example, be made of material preventing at least woofer frequency transmission, for example leather or a leather-like polymer or other synthetic or plastic material to convert the entire headrest or part thereof to a be comprised by or to represent the baffle body.

Advantageously, use of the headrest skin as (at least a part of) the baffle body can push a sound field between the front sets and the rear sets closer to the ears of a listener placing his or her head on or near the headrest while avoiding acoustic short circuit.

For example, the length of the near field acoustic wave flow path following the surface of the headrest between the duct openings of the front sets and duct openings of the at least one rear set is greater than 10 cm, for example greater than 20 cm, for example greater than 30 cm. For example, the distance between the duct openings of the front sets and duct openings of the at least one rear set is less than 80 cm, for example less than 60 cm, for example less than 50 cm.

The afore-mentioned distance is the shortest distance measured along the outer surface of the headrest in any direction if the headrest is in use.

Advantageously, the sound field can be formed by choosing the location of the duct openings of the front ducts and rear ducts.

For example, a distance between duct openings of the first front set and duct openings of the second front set is at least one of greater than 10 centimeter or less than 30 centimeter.

For example, the distance is measured by determining a center point for the duct openings respectively for the first front set and second front set and then measuring the distance between the center points. The respective center point is for example determined by determining the centroid (arithmetic mean equivalent to center of mass of all locations of openings), the geometric median (point minimizing the sum of Euclidean distances between openings) or Mode (most densely clustered positions of openings) for the respective locations of the openings of the respective front set if the front sets respectively comprise more than one duct.

Advantageously, the distance is set to provide high loudspeaker sensitivity measured at a listener's ear positions.

For example, one or more ducts of a set is a composite duct comprising a branched section and an unbranched section along its length. For example, at least a part of the vent ducts of at least one of the sets of vent ducts has a branching end section as a branched section. For example, the respective branching end sections respectively divide into more than one end sections when following the branching end sections towards the nearest outside of the headrest, for example towards the front side of the headrest in case of a front set. For example, the branching end sections end at openings (terminations) of the composite ducts (at the front or rear side of the headrest).

For example, when going along the vent duct from the chamber towards the outside of the headrest, the cross-sectional areas of the branched off vent duct sections are smaller than the cross-sectional area of the vent duct section before branching off.

For example, when going along the vent duct from the chamber towards the outside of the headrest, the summed up cross-sectional area of branched off sections (not subjected to a further branching off) deviates less than 20%, for example less than 10%, for example less than 5% from the vent duct before branching off starts. For example, a constant total cross-sectional area is retained along the full length of the composite duct except for optional end flaring.

The cross-sectional area mentioned herein is not measured in a section at the very end(s) of a vent duct where it opens in a flared end (see description of FIG. 7 below).

For example, when going along the vent duct from the chamber towards the outside of the headrest, the branching off of vent duct sections can occur at one location or can occur at more than one location.

Advantageously, the vent ducts with branching end sections allow for multiple openings in the headrest (referred to as "headrest openings", for example a grill comprising multiple headrest openings in the front side of the headrest) to be smaller than in case of non-branching end sections. These small openings allow for at least one of sound transmission from the duct opening towards the outside of the headrest or passing of end sections therethrough towards the outside while keeping SPL of the loudspeaker system high due to the high number of openings. Many small headrest openings can be more comfortable than few large headrest openings for the resting the head of a person thereon. Furthermore, stability of the headrest surface is higher and less amenable to damage.

According to a further invention, a loudspeaker assembly is provided. The loudspeaker assembly comprises a driver and a Helmholtz resonator. The Helmholtz resonator comprises a chamber and at least one vent duct. The at least one vent duct has a branching end section. The branching end section has at least one of the features as described above. For example, the loudspeaker assembly comprises a set of vent ducts which have features as described herein, for example the set is arranged and has properties as described herein. For example, the loudspeaker assembly further comprises a baffle body. For example, the baffle body comprises openings (baffle openings) for output sound from the loudspeaker assembly. For example, a plurality of baffle openings together with a section of the baffle including the plurality of baffle openings represents a grill. These plurality of baffle openings being constituted to allow for at least one of sound transmission from the vent duct openings towards the outside of the loudspeaker assembly or passing of end sections therethrough towards the outside. Features of the further invention can be combined with any of the other features mentioned herein. For example, the Helmholtz resonator can be active or passive. For example, the vent ducts can have the features as described herein with respect to the main invention (i.e. the invention as claimed in any of the claims). For example, the loudspeaker assembly can comprise at least one of the acoustic components (e.g. chambers, drivers, vent ducts, baffle sections) having features as described herein (above and below), for example as arranged herein. For example, a loudspeaker system which includes the loudspeaker assembly of the further invention only optionally comprises the headrest but can comprise the housing mentioned in the next paragraph. For example, the afore-mentioned baffle is an integral part of the housing and the baffle openings are the housing openings.

According to a still further invention, the loudspeaker system is as described herein with respect to the main invention (i.e the invention as claimed in any of the claims) but does not comprise the headrest. According to an aspect of this still further invention, the headrest of the main invention (i.e. the invention as claimed in any of the claims) is replaced by a housing (for example having at least one of rigid or soft parts) which, for example, includes housing openings replacing the headrest openings.

For example, (according to any of the inventions described herein) a cross-sectional area of at least one of the duct openings or headrest openings is at least one of larger than 1 square mm or smaller than 1 square cm. For example, the afore-mentioned branching allows for cross-sectional areas of at least one of the duct openings or headrest openings of smaller than 2 square mm. The duct openings are for example duct openings of at least one of sets of vent ducts.

For example, (according to any of the inventions described herein), at least a part of at least one of the sets comprises more than one vent duct, for example more than 3 vent ducts, for example more than 5 vent ducts.

Advantageously, this allows to form the sound field in order to achieve a good sound quality.

For example, the openings of the more than one vent ducts of at least one of the sets are arranged one above the other, if the headrest is used as intended (i.e. a person rests his or her head thereon). "One above the other" covers that the duct openings are arranged in a vertical pattern. That is, it is also covered that the duct openings are not necessarily exactly one above the other in vertical direction. For example, the duct openings are arranged one above the other while a higher duct opening is horizontally shifted (displaced) with respect to a lower duct opening (if the headrest is used as intended). For example, "one above the other" covers that a duct opening is, in vertical direction, directly above another duct opening without horizontal shift between the two duct openings or. For example, more than 3, for example more than 5 of the duct openings are arranged one above the other. Alternatively or additionally, duct openings can be arranged so that at least more than one duct opening are arranged besides each other (in horizontal direction).

Advantageously, this allows to form the sound field in order to achieve a high loudspeaker sensitivity measured at the listener's ears.

For example, (according to any of the inventions described herein) the primary sides of the first and second driver are selected to be those sides which have the property that, if observation of movement of the cone is performed in a back-to-back arrangement of the drivers and both drivers are driven by the same electrical sound signal (e.g. sinus signal), the observed movement of the cone of the drivers is in opposite direction. The secondary sides of the first and second drivers move outwards simultaneously and inwards simultaneously with respect to each other when driven by the same electrical sound signal (e.g. sinus signal).

For example, the first and second drivers are arranged in mechanical opposition. In this way, mechanical vibrations can be suppressed which may be disturbing for a person resting his or her head on the headrest.

For example, the relative position between at least one of the first and second driver or the first and second chamber is fixed by means of a support structure, for example by bracing the drivers.

For example, the at least one further chamber is located between at least one of the first and second drivers or first and second chambers. This allows to use wall sections of the enclosures enclosing the at least one further chamber which are located at the front side of the loudspeaker assembly as at least a part of the front baffle section. Furthermore, a rather compact arrangement of the loudspeaker assembly can be achieved. In one example, the magnets of the first and second drivers may be secured together for example by means of glue or they may be secured with a spacer between them.

For example, (according to any of the inventions described herein) the first and second front Helmholtz resonators are tuned so that, in the far field, sound emitted from the first and second front sets of ducts is out of phase with sound emitted from the rear set of ducts for reducing sound pressure level (SPL) in the far field. For example, for practical purposes, a distance of 1 m from the openings of the front set is considered to represent the far field where measurement of sound pressure level reduction is performed.

For example, sound emitted from the first and second front sets of ducts is out of phase by at least 100 degrees, preferably at least 130 degrees with sound emitted from the at least one rear set of ducts for improving reduction of sound pressure level in the far field, for example over all angles of radiation, for example over all frequencies of the operating band of the loudspeaker assembly. For example, for frequencies of the emitted sound below 100 Hz, the emitted sound is out phase for at least 120 degrees, for example at least 150 degrees.

For example, the shortest portion of a sound flow path (acoustic wave flow path) between primary and secondary sides of the drivers is, for example, defined to be the shortest path which a sound can follow if issued from the primary side of one of the drivers, leaving the chamber (first or second chamber) limited by the primary side, following the shortest path around the outside of the headrest to the nearest one of the at least one rear set, entering the at least one rear chamber via the vent ducts of the at least one rear set, and finally arriving at the secondary side of the same driver.

For example, (according to any of the inventions described herein) at least one of, for example, all of the Helmholtz resonators are tuned to an upper tuning frequency identifiable by an impedance peak above the Helmholtz frequency in the frequency spectrum, wherein the upper tuning frequency is at least one of above one octave above the operating band of the first and second driver or of the loudspeaker assembly or below four octaves above the operating band of the first and second driver or loudspeaker assembly. For example, the upper tuning frequency is 3 times (for example within a range of plus/minus 20%) the upper end of the operating band of the loudspeaker assembly or of the drivers.

An advantage of the above feature is that the chambers can have a small volume. For example, the volume of at least one of the chambers is smaller than 0.2 liters. For example, the volume of all chambers is smaller than 1 liter. For example, the volumes of the first and second chambers deviate by less than 10%, for example by less than 30%. For example, the volumes of the at least one of the first and second chamber and the at least one rear chamber deviate by less than 150%, for example 100%.

For example, the Helmholtz resonators is tuned to an upper tuning frequency. The upper tuning frequency is identifiable by an impedance peak above the Helmholtz frequency in the frequency spectrum. For example, the upper tuning frequencies of all Helmholtz resonators are approximately the same. For example, the upper tuning frequencies of the first and second front Helmholtz resonator are approximately the same. For example, the upper tuning frequencies of Helmholtz resonators the chambers of which are terminated by the same driver are approximately the same. "Approximately the same" means, for example, that deviations between the upper tuning frequencies are within a range of less than 10%, for example less than 2%.

For example, vent ducts for venting a chamber of a Helmholtz resonator have a cross-sectional area which is constant in shape at least along a major part of the length of the vent ducts which parts includes in particular the middle section of the vent ducts. For example, the cross-sectional area varies in size less than 20%, for example less than 10%, for example less than 5%, for example with the exception of optional end flaring of the vent ducts. For example, the vent ducts do not have a cross-sectional area gradually varying in at least one of size or shape at least not over a major part (more than 50% or more than 70%) of their lengthwise extension, in particular concerning the middle section of the vent ducts.

Advantageously, at least one of headrest and loudspeaker assembly is designed for minimising the length of the acoustic wave flow path. Advantageously, on the other hand, the front and rear duct terminations are not too close to each other for avoiding diminishing returns. Advantageously, a midpoint of the acoustic wave flow path is not in line with or close to the ears, because there will be a relatively sharp null at that point. Advantageously, the design is made to keep the midpoint of the acoustic wave flow path behind the baffle body or inside a duct for keeping the midpoint away from alignment with the listener's ears. A null at the midpoint means a minimum value of SPL, potentially with zero output. For example, to achieve that the null at the midpoint is not directed to the listener's ear (resting his or her head on the headrest), or, according to a further embodiment, for example, the midpoint is closer to the primary side than the openings of the front set or closer to the rear side of the headrest than to the front side of the headrest. The midpoint is halfway along the sound path flow from the primary side to the secondary side. For example, the flow path of the sound (acoustic wave) is the above-mentioned shortest portion of the sound flow path (acoustic wave flow path) between primary and secondary sides of the drivers.

DESCRIPTION OF EMBODIMENTS

According to an embodiment of the above described present invention, an intent of the present invention is to provide low (woofer) frequencies to a listener seated in a chair with a headrest. Typical woofer frequencies range from 30 to 200 Hz. To this end, the present invention comprises for example a low frequency loudspeaker assembly set inside the headrest. According to an advantage of the present invention, stable woofer frequencies are generated. According to another advantage, there is the potential ability to contain the woofer radiation to a single listener and according to a still further advantage, there is the potential ability to maximize the low frequency acoustic output at the ears of a listener. A still further advantage is the potential ability to minimize unwanted vibration in the headrest. According to a further embodiment, the headrest can also include at least one of mid or high frequency loudspeakers which can be seamlessly acoustically integrated with the loudspeaker assembly of the present invention.

Figure 1:
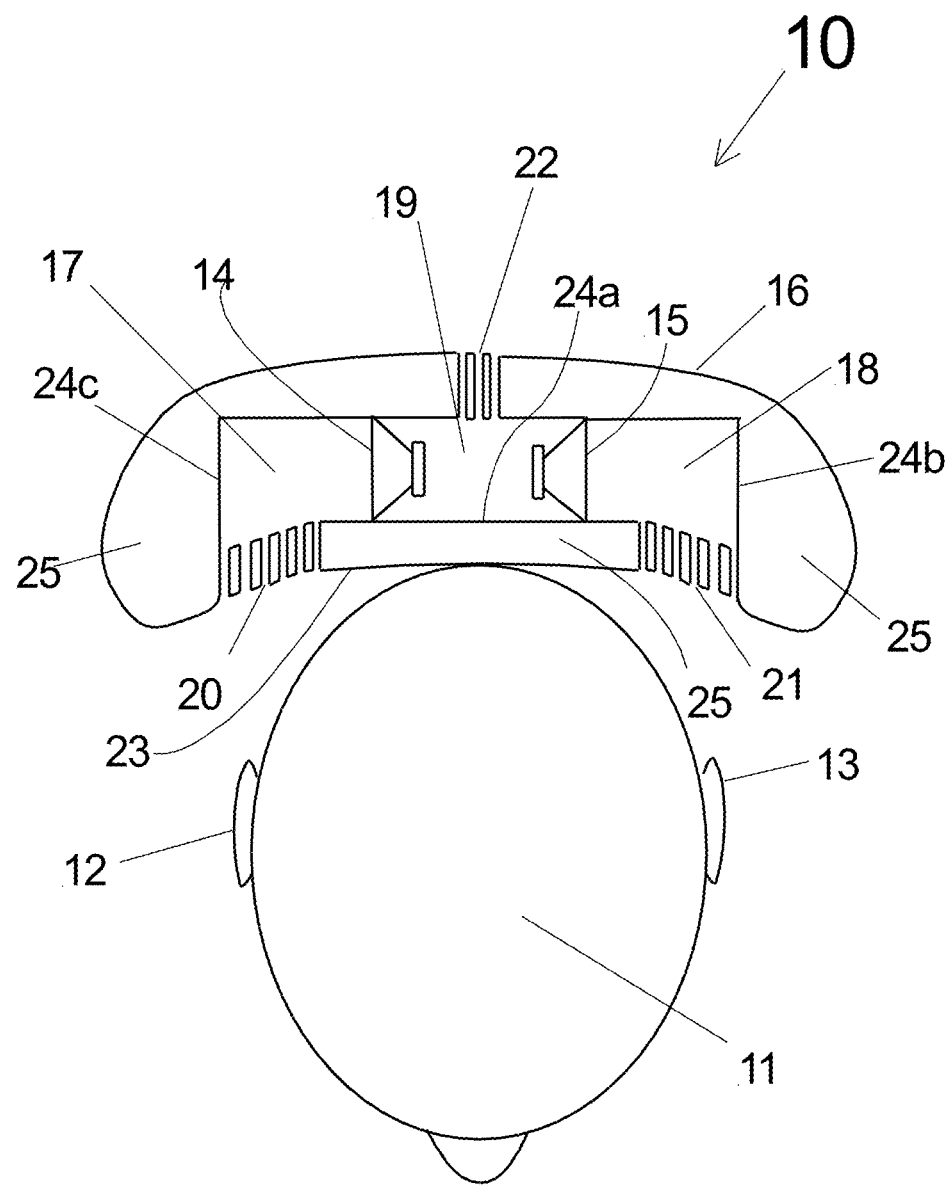
FIG. 1 is a schematic cross-section of a first embodiment of a loudspeaker system according to the present invention.
Figure 6:
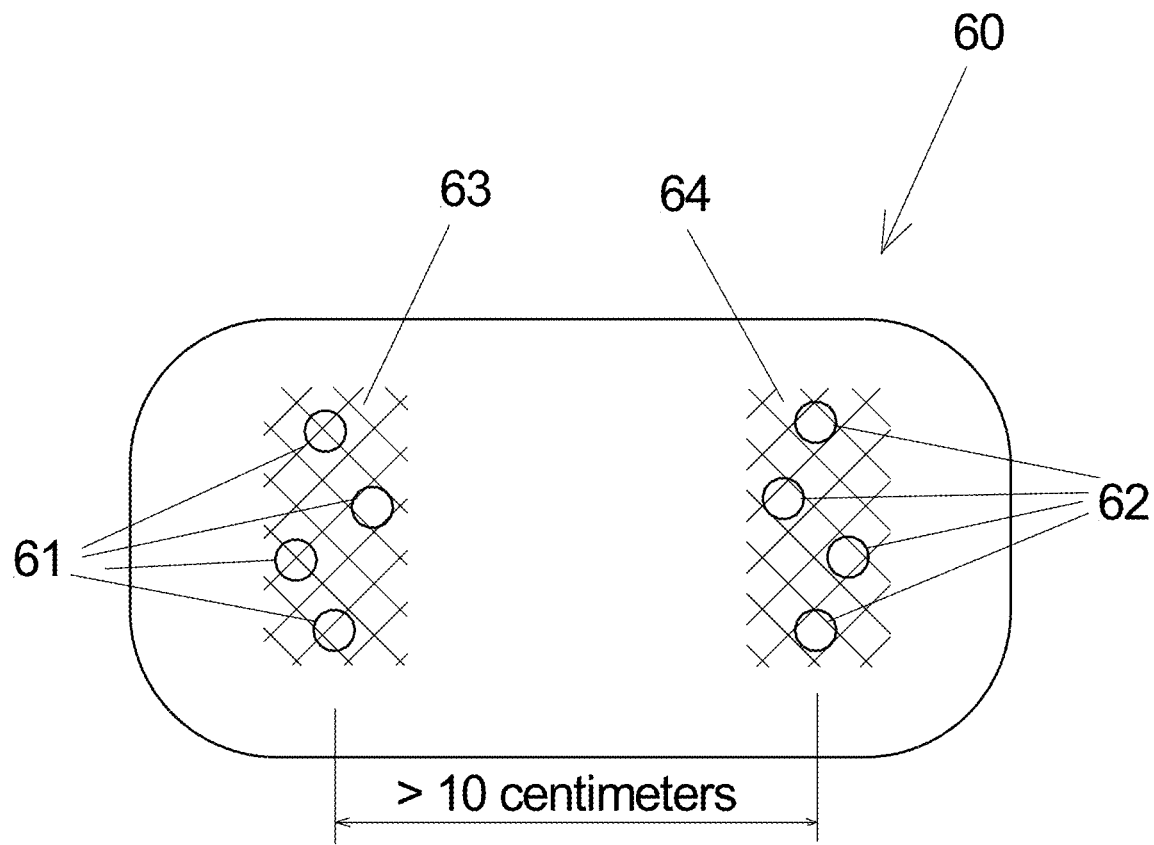
FIG. 6 is a representative view of the front of a headrest showing typical duct terminations

FIG. 1 shows an example embodiment 10 of the present invention. A listener's head 11 is resting on a headrest 16. A filling, for example a padding 25 is provided inside the outer surface of the headrest. For example, further inside thereof, the loudspeaker assembly is located. The loudspeaker assembly comprises two drivers 14, 15. The outer surface of the headrest 16 together with filling provides a part of a baffle body to prevent an acoustic short circuit through the headrest. For example, walls 24a, 24b and 24c for enclosing the chambers can represent a part of the baffle body, too. Two drivers 14, 15 are arranged in mechanical opposition to each other to cancel unwanted vibrations and prevent them transmitting to the listener's head 11. For example, a support structure assures that the relative position of the drivers 14 and 15 is fixed. For example, walls 24a, 24b and 24c enclosing the chambers can be used for the support structure. The advantage of using the mechanical opposition arrangement is that the drivers 14, 15 may be assigned greater moving mass in their design compared to an arrangement where vibration is not cancelled. The primary side of driver 14 radiates into chamber 17 and the primary side of driver 15 radiates into chamber 18. Chamber 17 is vented by a right set of ducts 20 and chamber 18 is vented by a left set of ducts 21 ("right" and "left" is understood from the perspective of a person resting his or her head on the headrest). For example, the end section of the vent ducts of the sets are formed of deformable material. The combination of ducts 20 with chamber 17 forms a front tunable Helmholtz resonator and the combination of ducts 21 with chamber 18 likewise forms a second front tunable Helmholtz resonator. The set of ducts 20 is shown as six ducts side by side to illustrate the principle of using multiple ducts rather than a single duct. However, the number of ducts may vary from one to eight (or more) per set and the ducts may be forked at the front termination as shown as 70b in FIG. 7. Also, the cross-section shape of the ducts may change at the front termination. The ducts are shown horizontally side by side for illustrative purposes only to indicate a number of small ducts. As shown in FIG. 6, the preferred layout of duct terminations 61, 62 at the front of the headrest is a vertical pattern with each set of terminations covered with a grill cloth 63, 64. An object of the proposed layout is to direct sound output from the ducts as directly as possible to the listener's ears (12, 13 in FIG. 1). To this end, the separation of duct terminations (also referred to as "vent duct openings") should preferably be about 15 centimeters between the centers of the left and right sets of ducts. However, this distance, for example, can range from 10 to 30 centimeters depending on the headrest size and shape.

Referring again to FIG. 1, the secondary sides of drivers 14, 15 radiate into a common chamber 19. This chamber is vented by a set of ducts 22, forming a rear tunable Helmholtz resonator. Accordingly, both front and rear radiation from the drivers exit the headrest. This constrains the output to near field because the short acoustic wave flow path acts like a short circuit with respect to the far field.

Figure 4:
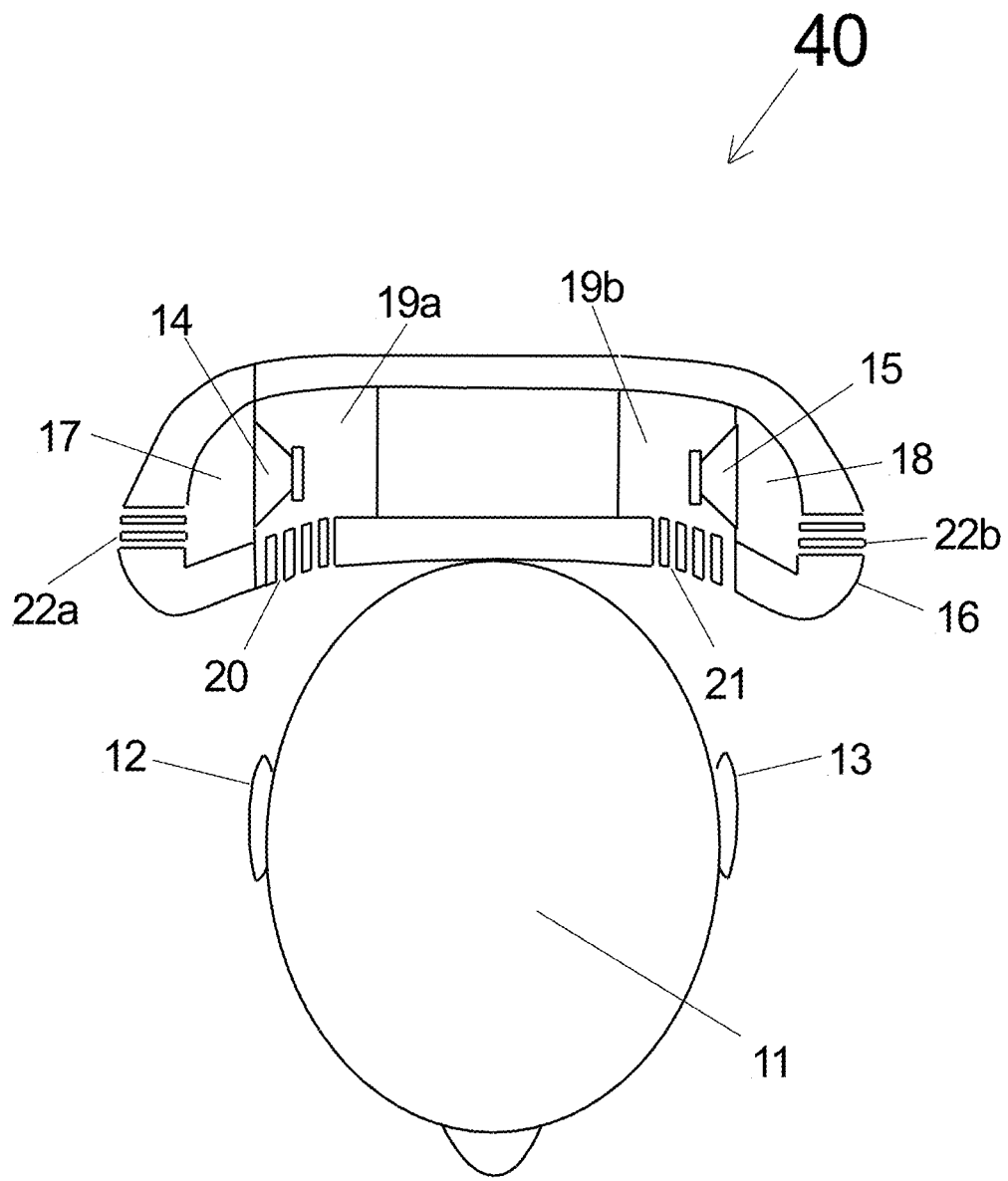
FIG. 4 is a schematic cross-section of a further embodiment of a loudspeaker system according to the present invention.
Figure 5:
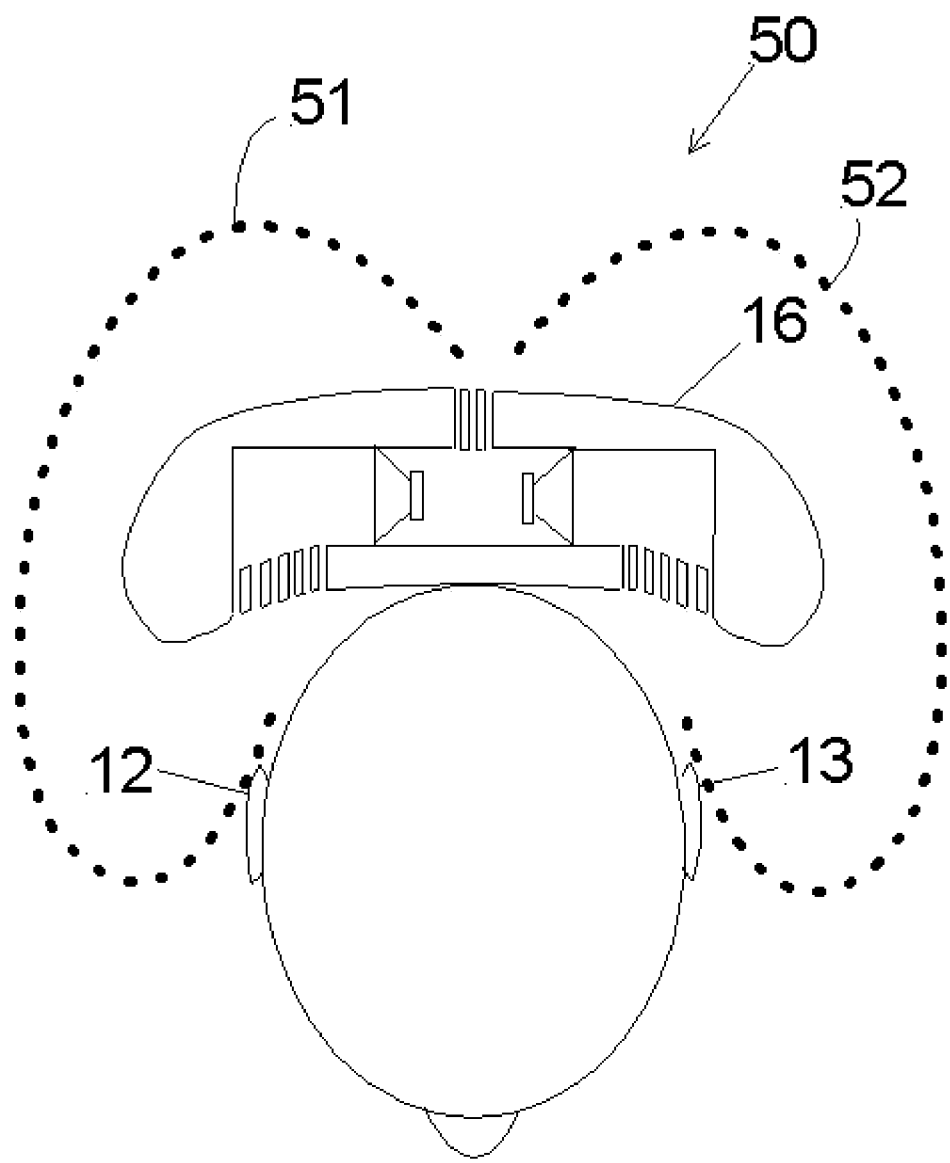
FIG. 5 is a schematic cross-section of the first embodiment of a loudspeaker system showing a representation of the near field acoustic wave flow path.

FIG. 5 provides a representation of the acoustic wave flow path. The dotted lines 51, 52 show the typical path of acoustic radiation between primary sides of drivers 14, 15 around a circuit to the secondary sides of the drivers. Importantly it flows past the ears 12, 13 of the listener 11. For low frequencies the wavelengths are long. If they are long relative to the acoustic wave flow path there will be an almost complete cancellation of sound in the far field and maximum intensity in the near field. In simple language, different passengers will not be disturbed by low frequencies radiated by other passengers. However, if the wavelengths are not long relative to acoustic wave flow path length, then there will be some disturbance in the far field. If the front Helmholtz resonators are tuned the same as the rear Helmholtz resonators maximum far field cancellation will occur at the midpoints of the acoustic paths. To maximize far field attenuation, it is of advantage to minimize the acoustic wave flow path length. FIG. 4 shows an embodiment providing acoustic wave flow path length minimization.

For example, the operating band can be limited by electrical filters, and, for example, the tuning of the Helmholtz resonators is not involved in limiting the operating band.

Accordingly, the embodiment of FIG. 1 has the advantages that it will substantially minimize far field emission of woofer frequencies; it will substantially maximize the low frequency acoustic output at the ears of a listener; It will provide stable woofer frequencies. At the same time, it will minimize unwanted vibration reaching the head of a listener. However, depending on the frequency of the upper end of the operating band—there can be some breakthrough of far field radiation at the upper end of the operating band.

Figure 2:
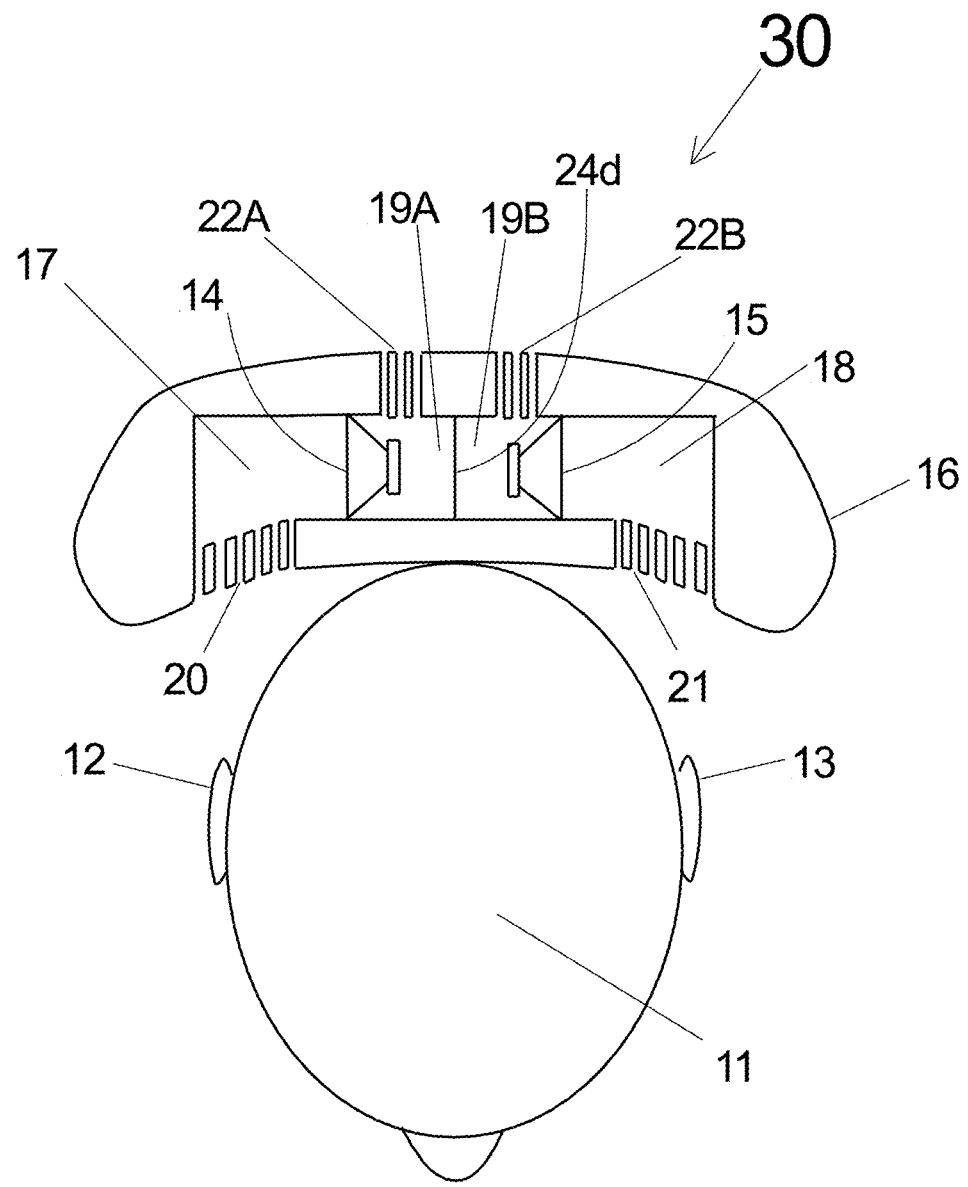
FIG. 2 is a schematic cross-section of a further embodiment of a loudspeaker system according to the present invention.

FIG. 2 shows an alternative embodiment, wherein there is no common chamber on the secondary sides of the drivers. Instead, the secondary side of driver 14 radiates into chamber 19A which is vented by a set of ducts 22A, and the secondary side of driver 15 radiates into chamber 19B which is vented by a set of ducts 22B. Again, the drivers are arranged in mechanical opposition to minimize unwanted vibration. The chamber 19A and 19B are separated by a wall 24d.

Figure 3:
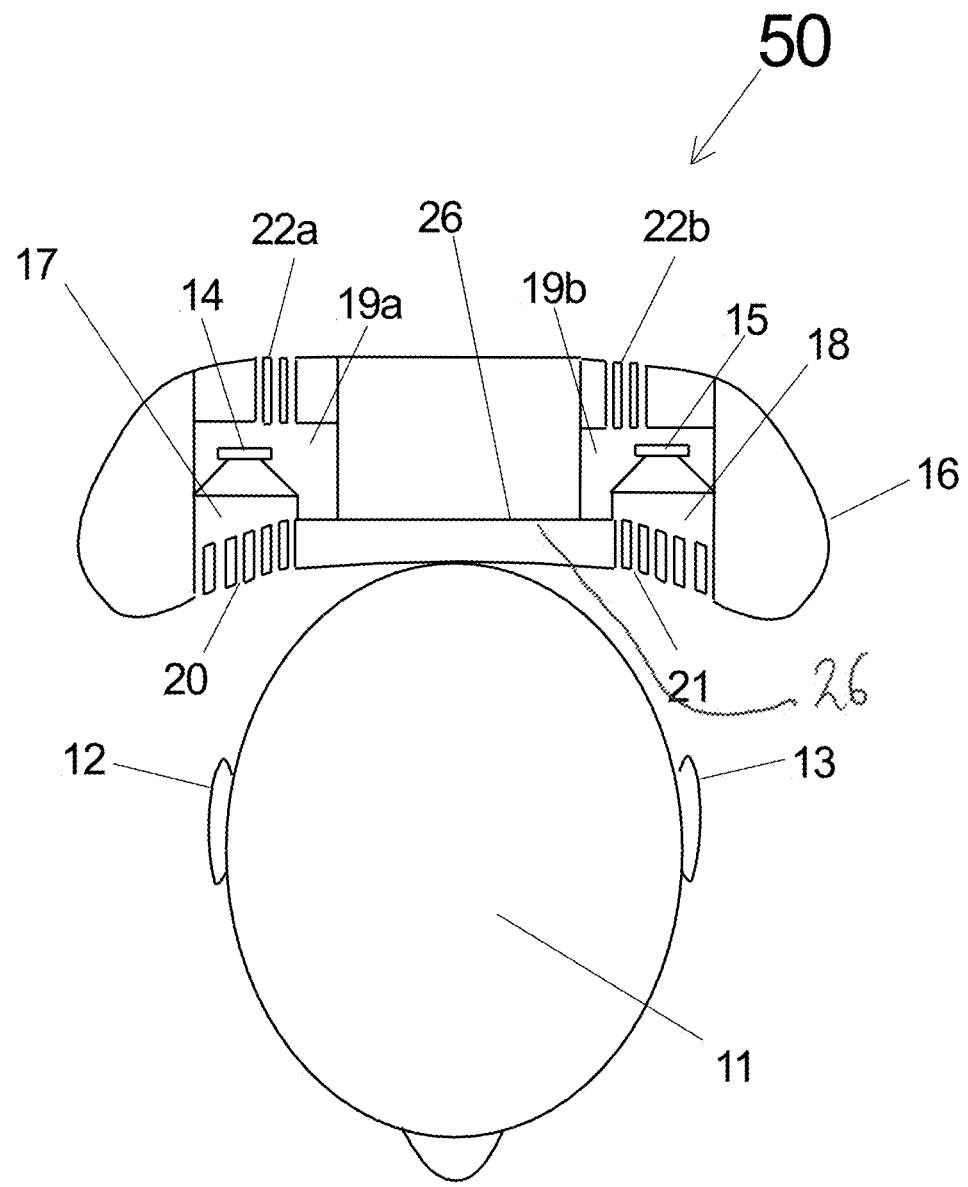
FIG. 3 is a schematic cross-section of a further embodiment of a loudspeaker system according to the present invention.

In FIG. 3 the parts are the same as in FIG. 2 but arranged differently. FIG. 3 shows a third embodiment of a loudspeaker assembly where the headrest forms a baffle body which is common for the loudspeaker assembly. In FIG. 3 the drivers 14, 15 are not in mechanical opposition. This means the moving mass of the drivers can be chosen to be low enough to prevent undue vibration. Low moving mass means the drivers require looser suspension to provide the low frequencies required for the operating band. The trade off is that the acoustic wave flow path length is shorter so far field sound cancellation will be improved. For example, a wall section 26 between the front walls limiting the chambers 19a and 19b at their front side is used as a part of the front baffle section. For example, the wall section 26 is used as a mechanical support structure to rigidly connect the chambers 19a and 19b.

In FIG. 4 the parts are the same as in FIGS. 2 and 3, but arranged differently. FIG. 4 shows an embodiment where drivers 14, 15 are in mechanical opposition, but far apart so they include adequate mechanical support structure (not shown) which allows for bracing of the drivers to minimize unwanted vibration. However, they have the advantage that the acoustic wave flow path length is quite short. This means far field sound field cancellation can be improved.

Figure 7:
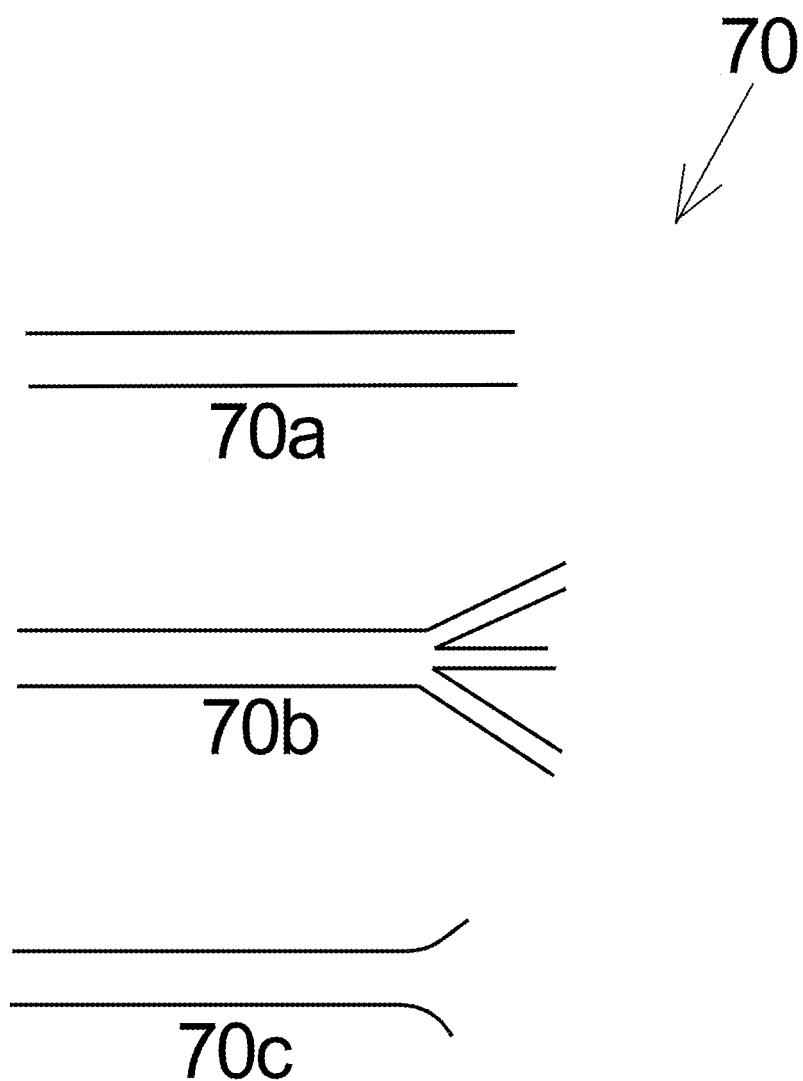
FIG. 7 shows three examples of advantageous duct shapes.

FIG. 7 shows examples of duct profiles that can be used in the present invention. 70a shows a straight duct, where the overall cross-sectional area relevant for tuning of the Helmholtz resonators is dependent on the number of vent ducts in a set. For example, the cross-sectional area of each vent duct in a five-duct set may be regarded as one fifth the cross-sectional area of a single vent duct of the same length for a given tuning, i.e., for the purpose of tuning, the cross-sectional areas of the vent ducts of a set can be summed up as a first approximation. This is despite the fact that there will be a trivial difference due to duct end effects not adding precisely, but that can usually be ignored in practice.

70b shows a duct with a branched end section, more specifically as a forked end where the smaller ducts branch off at the same section of the duct. The term "branched end section" also covers branching off of smaller ducts at different section of the vent duct. For design purposes the combined cross-sectional area of the branched vent duct segments, for example forked segments can be set equal to the cross-sectional area of the unbranched part of the branched end section, for example unforked section.

70c shows a duct with a flared end. Flared ends can be applied to one or both ends of one or more ducts of at least one of the sets to minimize air noise.

Advantageously, the present invention uses Helmholtz resonators.

There are advantages to using Helmholtz resonators that may not be obvious. One advantage is that the behavior is predictable and precise. A second advantage is that the duct terminations may be set to control acoustic wave flow path length. A third advantage is that the output can most accurately be directed to a listener's ears.

What is claimed is:

1. A loudspeaker system comprising a loudspeaker assembly and a headrest,
   the headrest comprising a front side and a side different from the front side referred to as rear side, the front side being constituted for resting a back side of a head of a person thereon;
   the loudspeaker assembly being accommodated in the headrest with its front side oriented towards the front side of the headrest, the loudspeaker assembly comprising:
   a first and a second driver, each driver having a primary side and a secondary side for respectively emitting sound;
   a first and second chamber, a part of the first chamber being limited by the primary side of the first driver and a part of the second chamber being limited by the primary side of the second driver;
   a first front set of vent ducts venting the first chamber and terminating at the front side of the headrest and a second front set of vent ducts venting the second chamber and terminating at the front side of the headrest; and
   at least one further chamber and at least one rear set of vent ducts; wherein
   the secondary sides of the first and second drivers limit a part of one of the at least one further chamber or respectively limit a part of different ones of the at least one further chamber, the at least one further chambers being respectively vented by a respective one of the at least one rear set of vent ducts terminating at the rear side of the headrest; and
   the first and second chambers together with the front ducts form front Helmholtz resonators, the at least one further chamber together with the at least one rear set of vent ducts form at least one rear Helmholtz resonator.

2. The loudspeaker system according to claim 1, wherein the first and second front sets comprise vent ducts which comprise a deformable section at least at the front side of the headrest where the vent ducts terminate.

3. The loudspeaker system according to claim 1, wherein a baffle body comprises a front baffle section constituted to block sound that travels from the at least one rear set through the headrest and then out of the front side of the headrest.

4. The loudspeaker system according to claim 1, wherein a distance between duct openings of the first front set and duct openings of the second front set is at least one of greater than 10 centimeter or less than 30 centimeter.

5. The loudspeaker system according to claim 1, wherein one or more vent ducts of the sets is a composite duct comprising a branched section and an unbranched section along its length, wherein at least a part of the vent ducts of at least one of the sets has a branching end section, the branching end section dividing into more than one end sections when following the branching end section towards that part of the outside of the headrest which is nearest to the branching end section, the cross-sectional areas of the individual more than one end sections being smaller than the cross-sectional area of the branching end section before the division.

6. The loudspeaker system according to claim 1, wherein a constant total cross-sectional area is retained along the full length of the composite duct to vary within a range of at maximum plus or minus 20% except for optional end flaring of the composite duct.

7. The loudspeaker system according to claim 1, wherein a cross-sectional area of duct openings of the vent ducts of the front sets is at least one of larger than 1 square mm or smaller than square 1 cm.

8. The loudspeaker system according to claim 1, wherein at least a part of at least one of the sets comprises more than one vent duct.

9. The loudspeaker system according to claim 1, wherein duct openings of the more than one ducts of a respective one of the sets are arranged one above the other, if the headrest is in use.

10. The loudspeaker system according to claim 1, wherein the first and second drivers are mounted in mechanical opposition and the at least one further chamber is located between the first and second drivers.

11. The loudspeaker system according to claim 1, wherein the shortest portion of a sound flow path between primary and secondary sides of the drivers is less than three wavelengths of the highest frequency of the operating band, and wherein sound emitted from the first and second front sets of ducts is out of phase by at least 130 degrees with sound emitted from the rear set of ducts for reducing sound pressure level in the far field over all angles of radiation.

12. The loudspeaker system according to claim 1, wherein at least one of the Helmholtz resonators is tuned to an upper tuning frequency identifiable by an impedance peak above the Helmholtz frequency in the frequency spectrum, wherein the upper tuning frequency is at least one of above one octave above the operating band of the loudspeaker assembly or below four octaves above the operating band of the loudspeaker assembly.

13. The loudspeaker system according to claim 1, wherein the Helmholtz resonators are tuned to an upper tuning frequency identifiable by an impedance peak above the Helmholtz frequency in the frequency spectrum, wherein the upper tuning frequency of at least two of the Helmholtz resonators do not deviate by more than 30%.

14. The loudspeaker system according to claim 1, wherein a null at the midpoint of the acoustic wave flow path between primary and secondary sides of the drivers is not directed to the listener's ears.

* * * * *